Aug. 12, 1952     J. E. COLLIER     2,606,758
WEDGE ADJUSTMENT TORSION BAR SPRING
Filed March 22, 1948
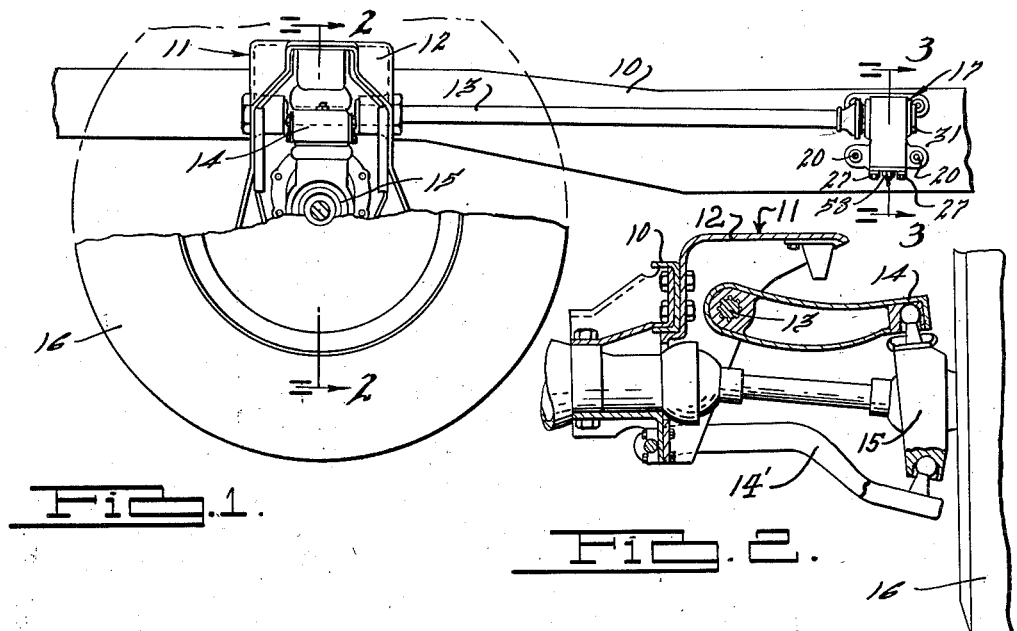
Fig. 1.
Fig. 2.
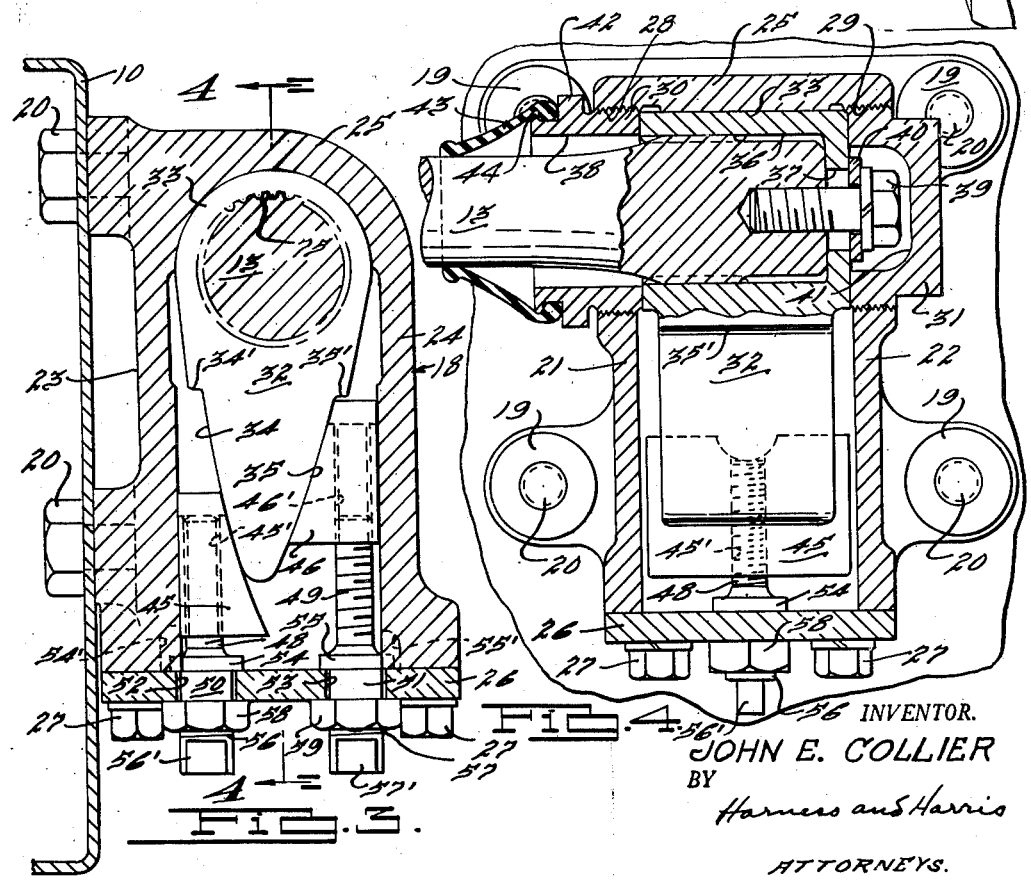
Fig. 3.
Fig. 4.
INVENTOR.
JOHN E. COLLIER
BY
Harness and Harris
ATTORNEYS.

Patented Aug. 12, 1952

2,606,758

UNITED STATES PATENT OFFICE 2,606,758

WEDGE ADJUSTMENT TORSION BAR SPRING

John E. Collier, Highland Park, Mich., assignor to Chrysler Corporation, Highland Park, Mich., a corporation of Delaware Application March 22, 1948, Serial No. 16,153

7 Claims. (Cl. 267—57)

My invention relates to vehicle suspension assemblies and more particularly to the adaptation of torsion bars thereto.

My invention provides improved means for conveniently effecting adjustment at the anchors for the torsion bars independently of each other. In suspension systems incorporating torsion bars non-adjustably fixed at one end to the vehicle frame, the vehicle tilts to one side causing undue tire wear when the vehicle load is greater on one side than the other. Such tilting can be readily compensated for by relative adjustment at the torsion bar anchors according to my invention. Furthermore, my invention provides an improved means for adjusting the vehicle frame relative to the ground when the frame is assembled with the ground wheels at the factory as well as providing for adjustment thereafter during use of the vehicle.

It is a principal object of my invention to provide a vehicle having an independent suspension assembly with mechanism for adjustably anchoring the torsion bar of the suspension assembly to the frame of the vehicle.

Another object of my invention is to provide a vehicle having a plurality of independent wheel suspension assemblies with a plurality of torsion rods and adjustable torsion rod anchoring mechanisms to torsionally balance the suspension assemblies of the vehicle.

It is a further object of my invention to provide a vehicle with a torsion rod anchoring mechanism which is adapted to receive a torsion bar from either end of the vehicle to thereby facilitate use of the mechanism at any one of a plurality of torsion rod anchoring stations on the vehicle.

Still another object of my invention is to provide a vehicle with a torsion rod anchoring mechanism which is not only simple in design but durable in construction.

Other objects and advantages of my invention will become more apparent from the following description taken in connection with the accompanying drawings in which:

Fig. 1 is a side elevational view of a vehicle chassis embodying my invention having portions cut away to more clearly show the suspension assembly of the vehicle.

Fig. 2 is a sectional view taken on the line 2—2 of Fig. 1.

Fig. 3 is a sectional view taken on the line 3—3 of Fig. 1.

Fig. 4 is a sectional view taken on the line 4—4 of Fig. 3.

In the drawings I have shown a vehicle frame structure 10 having a suspension assembly, generally designated as 11, mounted thereon. The assembly 11, as more clearly seen in Fig. 4, comprises in part a bracket 12 which is bolted to the frame structure 10 and has journaled therein one extremity of a torsion bar 13. This extremity of the torsion bar 13 is connected to one extremity of an upper control arm 14. The other extremity of the arm 14 is pivotally connected to one extremity of an upright knuckle bracket 15 which in turn carries a road wheel 16. The other extremity of the bracket 15 is pivotally connected to a lower control arm 14' which is pivotally mounted at the lower end of the bracket 12. The other extremity of the torsion bar 13 is fixed relative to the frame structure 10 by anchoring mechanism, generally designated by the number 17.

It will be understood, of course, that the suspension system, shown in Fig. 1, is for one side only of the vehicle and that a similar system will be provided for the other side of the vehicle, and at both sides of the other end of the vehicle, if desired. A torsion bar for the other side of the vehicle is also provided. I have not shown the suspension system in detail as any of various well known types of suspension systems may be utilized with my invention. The system as disclosed herein is disclosed in detail in the copending application of Collier and Utz, Serial No. 48,464, filed Sept. 9, 1948.

The anchoring mechanism 17, as more clearly shown in Figs. 2 and 3, comprises a housing, generally indicated as 18, having four outwardly extending apertured ear portions 19 which receive the threaded portions of studs 20 for securing the housing 18 to the frame structure 10. The housing 18 comprises a first pair of parallel walls 21 and 22 and a second pair of parallel walls 23 and 24 which are normal to the walls 21 and 22. The upper end of the housing 18, as shown in Fig. 2, is closed by a wall 25, the exterior face of which is partially curved while the interior face is semi-cylindrical. The lower portion of the housing 18 is closed by a plate 26 which is secured to the housing 18 by bolts 27. The walls 21 and 22 are provided with registering threaded apertures 28 and 29, respectively, the axes of which are coincident with the axis of the semi-cylindrical face of the wall 25. The apertures 28 and 29 are adapted to receive a partially threaded coupling 30 and a threaded closure plug 31, respectively.

A cam member 32 is disposed within the housing 18 and comprises an upper semi-cylindrical portion 33 and a downwardly extending lower portion eccentric with respect to the upper portion and having converging faces 34 and 35. The upper portion 33 of the cam member 32 is provided with a partially splined aperture 36, the axis of which is coincident with the axis of the upper semi-cylindrical portion 33. The aperture 36 is reduced adjacent one end thereof to form a smaller aperture 37. The inwardly extending edges of the coupling 30 and the closure plug 31 engage the upper portion 33 of the cam member 32 adjacent the apertures 36 and 37, respectively, to thereby hold the cam member from sideward motion, as viewed in Fig. 3. The coupling 30 is provided with an opening 38 which is in registering relationship with the aperture 36 to allow entrance of the extremity of the torsion bar 13 within the anchoring mechanism 17. The aperture 36 is adapted to receive this extremity of the torsion bar 13 which is also partially splined to engage with the splines within the aperture 36 of the cam member 32 as at 75. The torsion bar 13 is retained within the aperture 36 by a stud 39 which extends through the aperture 37 to engage the torsion bar 13. The head of the stud 39 is retained without the aperture 37 by means of a washer 40 which engages the edge portions of the aperture 37. The inwardly extending portion of the closure plug 31 that engages the cam member 32 is provided with a recess 41 to avoid engagement of the plug 31 with the bolt 39.

The outwardly extending portion of the closure plug 31 is of a substantially rectangular cross-section to facilitate the application of a tool for removing the plug 31 from the housing 18. The coupling 30 is similarly provided with a knurled portion 42 intermediate its open ends for facilitating the application of a tool for removing the coupling 30 from the housing 18. A rubber-like boot 43 having one end engaging the torsion bar 13 and having its other end retained on the coupling 30 by a peripheral flange 44 serves as a dust and dirt guard as well as a lubricant retainer for the anchoring mechanism 17.

The upper semi-cylindrical portion 33 of the cam member 32 is urged against the semi-cylindrical interior face of the wall 25 at all times by a pair of wedge members 45 and 46. Each wedge member is provided with a substantially vertical portion for engaging a wall of the housing 18 and a sloping portion for engaging one of the converging faces of the cam member 32. Wedge member 45 is disposed between wall 23 of the housing 18 and face 34 of the cam member 32 while the wedge member 46 is disposed between the wall 24 of the housing and face 35 of the cam member 32.

It can be readily seen that if one of the wedge members is moved downwardly and the other wedge member is moved upwardly the cam faces will move either rightwardly or leftwardly, as viewed in Fig. 2, about the axis of the semi-cylindrical portion 33 of the cam member 32. In this manner the splined extremity of the torsion bar 13 is rotated a small amount about its longitudinal axis. To accomplish this movement of the wedge member 45 and 46 which in turn adjustably rotate the torsion bar 13, the wedge members 45 and 46 are provided with threaded apertures 45' and 46', which receive threaded end portions of studs 48 and 49, respectively. Studs 48 and 49 are provided with non-threaded sections 50 and 51 which extend through apertures 52 and 53 in the plate 26, respectively. The threaded end portions of the studs 48 and 49 are retained within the housing 18 by shoulder portions 54 and 55 which engage the inner portion of plate 26. The walls 23 and 24 are provided with recesses 54' and 55' adjacent their lower ends so that the shoulder portions 54 and 55 will not engage the walls. The studs 48 and 49 are also threaded as at 56 and 57 adjacent the non-threaded sections 50 and 51, respectively, which threaded portions receive nuts 58 and 59. The ends of the studs 48 and 49, below the threaded sections 56 and 57 are of a substantially rectangular cross-section, as shown at 56' and 57', to facilitate application of a tool for rotating the studs 48 and 49 about their longitudinal axes. When the nuts 58 and 59 are in their applied positions, as more clearly shown in Fig. 2, they engage the outer face of the plate 26, around the apertures 52 and 53, thereby retaining the studs 48 and 49, respectively, in a rigid position.

It may be seen that if the nuts 58 and 59 are rotated and backed off of the threaded portions 56 and 57, respectively, the studs 48 and 49 may be rotated by application of a tool to the ends 56' and 57', thereby moving the wedge members 44 and 45 upwardly or downwardly as desired. The faces 34 and 35 are provided with shoulders 34' and 35', respectively, which limit the distance that the wedge members 44 and 45 may move upwardly, as viewed in Fig. 2. As shown in Fig. 2, the splined extremity of the torsion bar 13 may be rotated through an angle of approximately 9°, 4½° on each side of the vertical. By properly adjusting the wedge members 44 and 45, the cam member 32 may be adjustably fixed at any position of its angular swing about the axis of the aperture 36. In this manner the twist of the torsion bar 13 may be preset to torsionally adjust or balance the suspension system by raising or lowering the frame relative to the ground at the location of each wheel 16.

The mechanism 17, as disclosed in this invention, may be employed at any one of a plurality of torsion bar anchoring stations on a vehicle. To facilitate this employment, the mechanism 17 is so constructed to allow the entrance of the splined extremity of the torsion bar 13 into either side of the housing 18 of the mechanism.

The splined extremity of the torsion bar 13 may be removed from the mechanism by first removing the closure plug 31 and then the stud 39. The cam member 32 may then be removed by removing the plate 26 which carries the studs 48 and 49 as well as the wedge members 45 and 46. To reassemble the mechanism so that the splined extremity of the torsion bar 13 will enter the mechanism from the right as viewed in Fig. 3, the cam member 32 is rotated 180° about its vertical axis and reinserted into the housing 18, the plate 26 carrying the studs 48 and 49 and the wedge members 45 and 46 being bolted to the lower end of the housing thereafter. The coupling 30 must be withdrawn from the aperture 28 and threaded into the aperture 29. The splined extremity of the torsion bar 13 then may be inserted into the aperture 36, the stud 39 replaced through aperture 37, and the closure plug 31 threaded into aperture 28.

It will be readily seen that a standard mechanism may be employed for anchoring all of the torsion bars employed on a vehicle. Each mechanism, however, must be so assembled as to receive the splined extremity of the torsion bar from the desired direction. In this regard, the cam members of the assemblies may be adjusted in cooperation with each other so that the vehicle may be torsionally balanced regardless of the weight distribution of the vehicle. It will be understood, of course, that various forms of wheel suspension may be utilized with my invention.

Although but one embodiment of the invention is herein shown and described, it will be understood that various changes in the details of construction and materials employed may be made without departing from the spirit of the invention.

I claim:

1. In a vehicle comprising a frame structure, a wheel suspension assembly mounted on said frame structure, and a torsion bar having one extremity connected with said assembly, anchoring mechanism adapted to fix the other extremity of said torsion bar to said frame structure comprising a housing adapted to be detachably mounted on said frame structure and adapted to receive said other extremity of the torsion bar, a cam member in said housing and adapted to be secured to said other extremity of said torsion bar, and means having converging faces adjustably positioned in said housing and wedgingly disposed between said cam member and said housing to hold said other extremity of said torsion bar in an adjustably rigid position.

2. Mechanism adapted to adjustably anchor a torsion bar on the frame structure of a vehicle comprising a housing adapted to be connected to said structure, a cam member carried in said housing and adapted to be secured to said torsion bar, and a means having converging faces adjustably positioned within said housing and wedgingly disposed between said cam member and said housing to hold said torsion bar in an adjustably rigid position.

3. Mechanism adapted to adjustably anchor a torsion bar on the frame structure of a vehicle comprising a housing connected to said frame structure, a cam member journaled in said housing and having a portion connected to said torsion bar, said member having another portion eccentric with respect to said first mentioned portion including opposed surfaces, and a plurality of wedge members adjustably positioned within said housing and adapted to adjustably engage said housing and the opposed surfaces of the cam to thereby wedgingly hold said torsion rod in an adjustably rigid position.

4. Mechanism adapted to adjustably anchor a torsion bar on the frame structure of a vehicle comprising a housing adapted to be connected to said structure, a cam member carried in said housing and adapted to be secured to said torsion bar, a pair of wedge members positioned within said housing each wedgingly engaged between said housing and a different face of said cam member to hold said torsion bar in a rigid position, and means for adjusting said wedge members to accommodate movement of said cam member to a plurality of positions.

5. An anchoring device adapted to secure the torsion rod of the vehicle suspension system to the vehicle frame and to regulate the torsion thereof, said device including components which may be assembled in a first manner to cooperate with a torsion rod on one side of the device or in the alternative be assembled in a second manner to cooperate with a torsion rod on the opposite side of said device, said components including a housing adapted to be secured to said frame and having apertures in the opposite sides thereof adapted to selectively receive a torsion rod, a cam member located in said housing and having a first portion adapted to be secured to a torsion rod penetrating either of said apertures in non-rotative relation thereto, said cam member having a second portion eccentric with respect to said first portion including opposed surfaces; and adjustable means carried by said housing and wedgingly disposed between said opposed surfaces and said housing to thereby regulate the residual torsion on said rod.

6. An anchoring device adapted to secure the torsion rod of the vehicle suspension system to vehicle frame and to regulate the torsion thereof, said device including components which may be assembled in a first manner to cooperate with a torsion rod on one side of the device or in the alternative be assembled in a second manner to cooperate with a torsion rod on the opposite side of said device, said components including a housing adapted to be secured to said frame and having apertures in the opposite sides thereof adapted to selectively receive a torsion rod, a cam member located in said housing having opposed converging faces adapted to be non-rotatively secured to a torsion rod penetrating either of said apertures, an adjustable wedge means carried by said housing and wedgingly disposed between said faces and said housing, and means for adjusting said wedge means to regulate the residual torsion of said rod.

7. An anchoring device adapted to secure the torsion rod of the vehicle suspension system to vehicle frame and to regulate the torsion thereof, said device including components which may be assembled in a first manner to cooperate with a torsion rod on one side of the device or in the alternative be assembled in a second manner to cooperate with a torsion rod on the opposite side of said device, said components including a housing adapted to be detachably mounted on said frame and having opposed walls substantially normal to said frame, said walls being provided with registering apertures therein, a cam member disposed within said housing and having a first portion adapted to receive one end of a torsion bar through one of said apertures, said cam member having a second portion depending from and eccentric to said first portion, means disposed within said apertures adapted to hold said cam member from movement in a direction longitudinal of the frame, wedge members wedgingly disposed between said second portion of said cam member and said housing, and means adapted to adjustably position said wedge members relative to said second portion of said cam member to thereby adjustably fix said end of said torsion rod to said frame.

JOHN E. COLLIER.

REFERENCES CITED

The following references are of record in the file of this patent:

UNITED STATES PATENTS

| Number | Name | Date |
| --- | --- | --- |
| 2,103,590 | Lefevre | Dec. 28, 1937 |
| 2,224,717 | Austin | Dec. 10, 1940 |

FOREIGN PATENTS

| Number | Country | Date |
| --- | --- | --- |
| 427,907 | Great Britain | May 2, 1935 |
| 865,881 | France | Mar. 17, 1941 |